2,928,815

POLYMERIZATION CATALYST RESIDUE REMOVAL PROCESS

George Nelson Hammer, Orange, Tex., and Keith Leon Uhland, Parkersburg, W. Va., assignors to E. I. du Pont de Nemours and Company, Wilmington, Del., a corporation of Delaware No Drawing. Application October 8, 1956
Serial No. 614,384

7 Claims. (Cl. 260—93.7)

This invention concerns a method for removal of certain catalyst residues from mixtures obtained in the polymerization of olefins.

Clean-up of olefin polymers to remove catalyst residues has been an important problem in polymerizations involving a "coordination" type catalyst, e.g. a halide of a transition element (Ti, V, W, Cr, Nb, Mo) in combination with a reducing component such as a compound having a metal bonded directly to hydrocarbon or —H. The present invention is directed to a process for removal of catalyst residues from solutions of polymers thus made.

It has been discovered in accordance with this invention that the catalyst residues can be extracted from hydrocarbon media by means of ethylene glycol or other liquid polyhydroxyalkane capable of forming a second phase when mixed with said hydrocarbon.

The invention can be practiced by simply extracting the total crude polymerization product with ethylene glycol. Since a liquid hydrocarbon medium, such as heptane, decane, benzene, xylene, or the like, is quite generally used in these polymerizations, the extraction involves two liquid phases in all instances. Additional agents which may assist in the transfer of catalyst residue to the glycol phase may be present, generally in amounts less than 0.1% of the weight of liquid hydrocarbon; examples of these agents include alkanols, acetyl acetone, and higher polyhydroxyalkanes. The glycol phase contains the catalyst residues. Only a little glycol, not exceeding about fifteen percent, becomes dissolved in the hydrocarbon phase. This glycol, and solvent hydrocarbon, are readily removed from the polymer in the hydrocarbon phase by flashing, i.e. rapid evaporation, preferably produced by lowering of the pressure while the hydrocarbon is at a temperature well above its normal boiling point. The liquid hydrocarbons (even those boiling as low as heptane) are azeotropic with ethylene glycol, and this explains the easy removal of the glycol during evaporation of the solvent hydrocarbon. If desired, last traces of solvent can be removed from the polymer by means of an extruder-extractor, which is an apparatus for advancing molten polymer along an extrusion screw while applying a vacuum to the molten polymer for withdrawal of volatile components. The liquid hydrocarbon can, of course, be recovered, washed free of glycol, and reused; the glycol can also be recovered from the washings, as well as from the glycol layer, and reused also, if desired. It is frequently not desirable from an economic standpoint to recover the catalyst residues from the glycol layer, but this can be done if desired.

The extraction of the polymerization mixture with ethylene glycol should be performed at a temperature of about 100° to 300° C. The quantity of ethylene glycol added should be sufficient to form a separate phase at the temperature at which separation of the phases takes place. Generally, this weight of ethylene glycol is at least about 2% of the weight of the mixture to which the glycol is added and preferably about 0.02 to 1.0 times the weight of the said mixture. The maximum quantity could be as much as about fifty times the weight of said mixture, but of course it is disadvantageous to employ any such maximum amount. The extraction may be performed countercurrently; rotating parallel discs or other suitable devices may be used to assist in producing contact between two liquid phases, if desired. The extraction may be performed in successive steps.

When the extraction temperature is above the normal boiling temperature of the liquid medium, superatmospheric pressure should be used. This is the preferred method for carrying out the process of the invention.

In a particular embodiment of the invention a quantity of ethylene glycol within the range hereinabove specified is thoroughly admixed with the crude polymerization products, after which the glycol phase separates. Where the temperature is above the normal boiling point, the separation step must, of course, be performed at superatmospheric pressure. The mixture can be centrifuged if desired. The lower phase is withdrawn, by using a suitable separator, and glycol is recoverable therefrom, as hereinabove mentioned, suitably by distillation. The upper phase is also withdrawn, and the polymer is recoverable by "flashing" the volatile components as above described.

The coordination catalyst systems which are employed in the practice of this invention may have, as their transition element compounds, such halides as $TiCl_4$, $VOCl_3$, $Ti(Oalkyl)_2Cl_2$, $TiBr_4$, $MoCl_5$, $WCl_5$, $WOCl_4$, or mixtures thereof. As reducing components, the following may be used: lithium alkyls, tin alkyls, alkyl magnesium halides, dialkyl magnesium, lithium aluminum hydride, lithium aluminum tetraalkyls, aluminum trialyls, aluminum dialkyl halides, aluminum monoalkyl dihalides, alkali metal aluminum alkyl halides, corresponding compounds in which alkyl groups are substituted by cycloalkyl, aryl, aralkyl, or cycloalkyl substituted alkyl groups, and many others.

The invention is not limited by any theory as to the physico-chemical mechanism of the extraction step; it being understood that either chemical reaction, or physical solution, or both may be involved, during the operations herein described. Whatever the mechanism, the glycol has the effect of withdrawing catalyst residue from the hydrocarbon phase, and this results in excellent clean-up of the polymeric product.

The process of the invention is highly effective when the monomer initially employed is ethylene, propylene, styrene, norbornylene, higher 1-alkenes (such as pentene-1, hexene-1, octadecene-1, etc.) or any combination of these monomers, or combinations thereof with other vinyl or vinylidene compounds. Moreover, diene hydrocarbons and combinations thereof with one or more of the above-listed monoolefinic compounds may also be used. As has been reported heretofore, elevated pressures may be used in the polymerization step, to keep the medium liquid. Low or elevated temperatures (0° to 300° C., preferably 100° to 300° C.) may also be used. Inert hydrocarbon solvents which may be employed are, in general, the same as above-described in connection with the extraction step.

The invention is illustrated further by means of the following example.

*Example*

Into a one-gallon steel autoclave was pumped a catalyst stream formed by uniting two separate streams of catalyst components. The first of these was a mixture of $TiCl_4 + VOCl_3$ in cyclohexane (Ti:V mol ratio=4:1); conc. about 10 milligram mols per pound of cyclohexane). The second stream was aluminum tri-isobutyl, in cyclohexane (about 10 milligram mols per pound of cyclohexane), the rate of introduction of aluminum triisobutyl being 18.0 milligram mols per hour (ratio Al:(Ti+V)=1.68, mol basis). Cyclohexane, in sufficient quantity to raise the total amount of cyclohexane to 41.2 pounds per hour, was also introduced into the reactor. In addition, ethylene was introduced under pressure of 2500 pounds per square inch. The temperature in the reactor was maintained at 252° C. At the bottom of the reactor an exit means was provided, the inlets being at the top of the reactor. The product was withdrawn, by means of the exit line, into a jet mixer into which ethylene glycol was injected at the rate of 15.2 pounds per hour. Into the jet mixer metallic sodium was also introduced at a rate of 119 milligram mols per hour. (NOTE.—When the sodium was omitted, the catalyst still transferred to the glycol layer, but there was no cleanup of HCl, small amounts of which were formed.) From the jet mixer the product passed continuously to a separator (capacity, 6 gallons), wherein the pressure was 1430 pounds per square inch and the temperature was 231°. The glycol layer was removed, and the hydrocarbon layer was sent to a flash vaporization apparatus operated at 250° C., at atmospheric pressure. This vaporized most of the volatile ingredients, there being only about 0.5% of glycol in the linear polyethylene residue. The ash content was 200 parts per million. Polymer made by the same process, except for the glycol extraction step, had an ash content of 630 parts per million. Repeated extraction of cyclohexane solution of the polymer at 250° could be used to lower the ash content still further. Similar results were obtained using propylene in place of ethylene, the polymeric product in that instance being solid head-to-tail polypropylene.

It is to be understood that the foregoing example is primarily illustrative, and is not intended to limit the invention. Thus similar results are obtained when $TiCl_4$+LiAl(alkyl)$_4$ are used as catalyst components. Various other deviations from the illustrated procedure are possible. For example, very much smaller amounts of glycol can be used, and the operations can be performed in a series of steps, if desired, repeating the extraction numerous times, if desired, for further lowering of ash content.

We claim:

1. A process for removing catalyst residue from a liquid hydrocarbon medium having hydrocarbon polymer dissolved therein, and containing polymerization catalyst residue, which comprises extracting said residue from said hydrocarbon medium by means of ethylene glycol at a temperature within the range of 100° to 300° C., said residue being formed from polymerization catalyst obtained by reaction between a transition element halide wherein said transition element is a metal of the class consisting of Ti, V, W, and Mo, and a compound having metal directly attached to a member of the class consisting of hydrogen and hydrocarbon, the said metal being of the class consisting of alkali metals, tin, magnesium and aluminum.

2. Process of claim 1 wherein the transition metal halide is a mixture of $TiCl_4$ and $VOCl_3$ and the metal compound is Al(alkyl)$_3$.

3. Process of claim 1 wherein the transition metal halide is $TiCl_4$ and the metal compound is LiAl(alkyl)$_4$.

4. Process of claim 1 wherein said medium employed in the extraction is a hydrocarbon which is azeotropic with ethylene glycol.

5. Process of claim 4 wherein the hydrocarbon phase resulting from the said extraction is subjected to flash vaporization, whereby both the said hydrocarbon and ethylene glycol dissolved therein are vaporized, leaving a polymeric hydrocarbon residue.

6. Process of claim 5 wherein said hydrocarbon phase contains normally solid substantially linear polyethylene dissolved therein.

7. Proces of claim 5 wherein said hydrocarbon phase contains normally solid head-to-tail polypropylene dissolved therein.

References Cited in the file of this patent

UNITED STATES PATENTS

| | | |
|---|---|---|
| 2,683,139 | Leary et al. | July 6, 1954 |
| 2,868,771 | Ray et al. | Jan. 13, 1959 |
| 2,868,772 | Ray et al. | Jan. 13, 1959 |
| 2,886,561 | Reynolds et al. | May 12, 1959 |
| 2,890,214 | Brightbill et al. | June 9, 1959 |

FOREIGN PATENTS

| | | |
|---|---|---|
| 533,362 | Belgium | May 16, 1955 |
| 544,418 | Belgium | Jan. 31, 1956 |

UNITED STATES PATENT OFFICE

CERTIFICATE OF CORRECTION

Patent No. 2,928,815            March 15, 1960

George Nelson Hammer et al.

It is hereby certified that error appears in the printed specification of the above numbered patent requiring correction and that the said Letters Patent should read as corrected below.

Column 2, line 34, for "trialyls" read -- trialkyls --; line 69, after "4:1" strike out the closing parenthesis.

Signed and sealed this 23rd day of August 1960.

(SEAL)
Attest:
KARL H. AXLINE           ROBERT C. WATSON
Attesting Officer           Commissioner of Patents